US010972463B2

(12) United States Patent
Suthar et al.

(10) Patent No.: US 10,972,463 B2
(45) Date of Patent: Apr. 6, 2021

(54) BLOCKCHAIN-BASED NB-IOT DEVICES

(71) Applicant: Cisco Technology, Inc., San Jose, CA (US)

(72) Inventors: Om Prakash Suthar, Bolingbrook, IL (US); Mark Ammar Rayes, San Ramon, CA (US); Aeneas Sean Dodd-Noble, Andover, MA (US); Michael David Geller, Weston, FL (US); Ian McDowell Campbell, Littleton, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/180,678

(22) Filed: Nov. 5, 2018

(65) Prior Publication Data
US 2019/0379664 A1 Dec. 12, 2019

Related U.S. Application Data

(60) Provisional application No. 62/681,514, filed on Jun. 6, 2018.

(51) Int. Cl.
*H04M 1/66* (2006.01)
*H04M 1/68* (2006.01)
(Continued)

(52) U.S. Cl.
CPC .......... *H04L 63/0892* (2013.01); *H04L 63/20* (2013.01); *H04W 4/70* (2018.02);
(Continued)

(58) Field of Classification Search
CPC ....... H04W 4/24; H04W 12/06; H04W 12/12; H04W 84/14; H04W 88/06; H04M 2215/32
(Continued)

(56) References Cited

U.S. PATENT DOCUMENTS 10,108,954 B2  10/2018  Dunlevy et al.
10,123,202 B1  11/2018  Polehn et al.
(Continued)

FOREIGN PATENT DOCUMENTS

CN   107784748 A   3/2018
WO   2017187397 A1  11/2017

OTHER PUBLICATIONS

"IoT 2020: Smart and Secure IoT Platform", International Electrotechnical Commission, Oct. 11 2016, pp. 1-181.
(Continued)

*Primary Examiner* — Matthew W Genack
(74) *Attorney, Agent, or Firm* — Polsinelli PC

(57) ABSTRACT

Various implementations disclosed herein enable blockchain programming in NB-IoT devices. In various implementations, a method of blockchain authentication is performed by a computing device including one or more processors, and a non-transitory memory. In various implementations, the method includes maintaining a blockchain for a machine-to-machine network, wherein the machine-to-machine network is a narrowband internet of things network. In some implementations, the method includes receiving a request for a first set of data from the blockchain by a second device. In some implementations, the method includes determining based on the request, the first set of data from the blockchain by traversing a series of blocks from the blockchain. In some implementations, the method includes packaging the first set of data from the blockchain according to a protocol into a packaged data unit and transmitting the packaged data unit to the second device.

20 Claims, 7 Drawing Sheets

(51) Int. Cl.
- *H04M 3/16* (2006.01)
- *H04L 29/06* (2006.01)
- *H04W 4/70* (2018.01)
- *H04W 12/06* (2021.01)
- *H04W 8/24* (2009.01)
- *H04W 12/08* (2021.01)
- *G06F 9/455* (2018.01)

(52) U.S. Cl.
CPC .............. *H04W 8/24* (2013.01); *H04W 12/06* (2013.01); *H04W 12/08* (2013.01); *G06F 9/455* (2013.01); *H04L 63/168* (2013.01)

(58) Field of Classification Search
USPC ............ 455/405–408, 410–411, 426.1–426.2
See application file for complete search history.

(56) References Cited

U.S. PATENT DOCUMENTS

| | | | |
|---|---|---|---|
| 10,164,779 B2 | 12/2018 | Uhr | |
| 10,171,248 B2 | 1/2019 | King | |
| 2004/0029576 A1 | 2/2004 | Flykt et al. | |
| 2006/0146803 A1 | 7/2006 | Bae et al. | |
| 2006/0245406 A1 | 11/2006 | Shim | |
| 2007/0130471 A1 | 6/2007 | Walker Pina et al. | |
| 2012/0284777 A1 | 11/2012 | Eugenio et al. | |
| 2015/0063166 A1 | 3/2015 | Sif et al. | |
| 2015/0379510 A1 | 12/2015 | Smith | |
| 2017/0116693 A1* | 4/2017 | Rae ...................... G06F 21/64 | |
| 2017/0164212 A1 | 6/2017 | Opsenica et al. | |
| 2017/0177898 A1* | 6/2017 | Dillenberger ....... G06F 16/2379 | |
| 2017/0180134 A1 | 6/2017 | King | |
| 2017/0214675 A1 | 7/2017 | Johnsrud et al. | |
| 2017/0243208 A1 | 8/2017 | Kurian et al. | |
| 2017/0302663 A1 | 10/2017 | Nainar et al. | |
| 2017/0330179 A1 | 11/2017 | Song et al. | |
| 2017/0330180 A1 | 11/2017 | Song et al. | |
| 2017/0332421 A1 | 11/2017 | Sternberg et al. | |
| 2017/0364700 A1 | 12/2017 | Goldfarb et al. | |
| 2018/0060835 A1 | 3/2018 | Martin | |
| 2018/0082076 A1* | 3/2018 | Murray ................. H04L 9/0631 | |
| 2018/0084427 A1 | 3/2018 | Huo | |
| 2018/0136633 A1 | 5/2018 | Small et al. | |
| 2018/0137512 A1 | 5/2018 | Georgiadis et al. | |
| 2018/0139056 A1 | 5/2018 | Imai et al. | |
| 2018/0139107 A1 | 5/2018 | Senarath et al. | |
| 2018/0197173 A1* | 7/2018 | Durvasula .......... G06Q 20/3829 | |
| 2018/0212970 A1 | 7/2018 | Chen et al. | |
| 2018/0253539 A1 | 9/2018 | Minter et al. | |
| 2018/0270666 A1* | 9/2018 | Lee ....................... H04L 9/3242 | |
| 2018/0287806 A1* | 10/2018 | Carboni ................. G06F 17/16 | |
| 2018/0294966 A1 | 10/2018 | Hyun et al. | |
| 2018/0294977 A1 | 10/2018 | Uhr et al. | |
| 2018/0343128 A1 | 11/2018 | Uhr et al. | |
| 2018/0374094 A1 | 12/2018 | Kohli et al. | |
| 2019/0005470 A1 | 1/2019 | Uhr et al. | |
| 2019/0012695 A1 | 1/2019 | Bishnoi et al. | |
| 2019/0058709 A1 | 2/2019 | Kempf et al. | |
| 2019/0197532 A1* | 6/2019 | Jayachandran .... G06Q 20/3829 | |

OTHER PUBLICATIONS

Jun Lin et al., "Using Blockchain Technology to Build Trust LoRaWAN Sharing Server", Emeraldinsight.com, Sep. 7, 2017, pp. 1-15.

Abdulqadder, Ihsan H., et al, "Deployment of Robust Security Scheme in SDN Based 5G Network Over NFV Enabled Cloud Environment," IEEE, 2018, pp. 1-12.

Blockchain @ Telco: How blockchain can impact the telecommunications industry and its relevance to the C-Suite, Monitor Deloitte, Jun. 20, 2018, 13 pages.

Kaloxylos, Alexandros, "A Survey and an Analysis of Network Slicing in 5G Networks," IEEE Communications Standards Magazine, Mar. 2018, pp. 60-65.

Moinet, Axel, et al., "Blockchain based trust & authentication for decentralized sensor networks," Jun. 6, 2017, 6 pages.

Morozov, Yury, "BubbleTone Blockchain: Global Telecom Ecosystem Without Intermediaries: Smart Contracts Allow Direct Interaction Between Mobile Operators, Subscribers and Service Providers," Dec. 29, 2017, 33 pages.

Yang, Hui, et al., "Blockchain-based trusted authentication in cloud radio over fiber network for 5g," Optical Communications and Networks (ICOCN), 2017 16th International Conference on IEEE, 2017, 3 pages.

* cited by examiner

US 10,972,463 B2

BLOCKCHAIN-BASED NB-IOT DEVICES

PRIORITY CLAIM

This application claims priority to U.S. provisional patent application No. 62/681,514 filed on Jun. 6, 2018, the contents of which are hereby incorporated by reference.

TECHNICAL FIELD

The present disclosure generally relates to Narrowband Internet of Things (NB-IoT) devices, and in particular, to blockchain-based NB-IoT devices.

BACKGROUND

NB-IoT devices are becoming more popular and pervasive across network systems. NB-IoT devices are gaining momentum in part because of their use of 200 kHz. IoT devices, which consume less power, are inexpensive and can be deployed on an existing cellular mobile network with minimal changes. Some NB-IoT devices may have up to a ten-year battery life, for example. There is a need for User Equipment (UE) and various entities to transact, and convey entitlements for authentication, authorization and charging. There is also a need to share resources. Some previously available systems utilize an overlay which does not involve the network. Such approaches can be problematic because, without the network access, the devices lack connectivity and are generally less useful.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
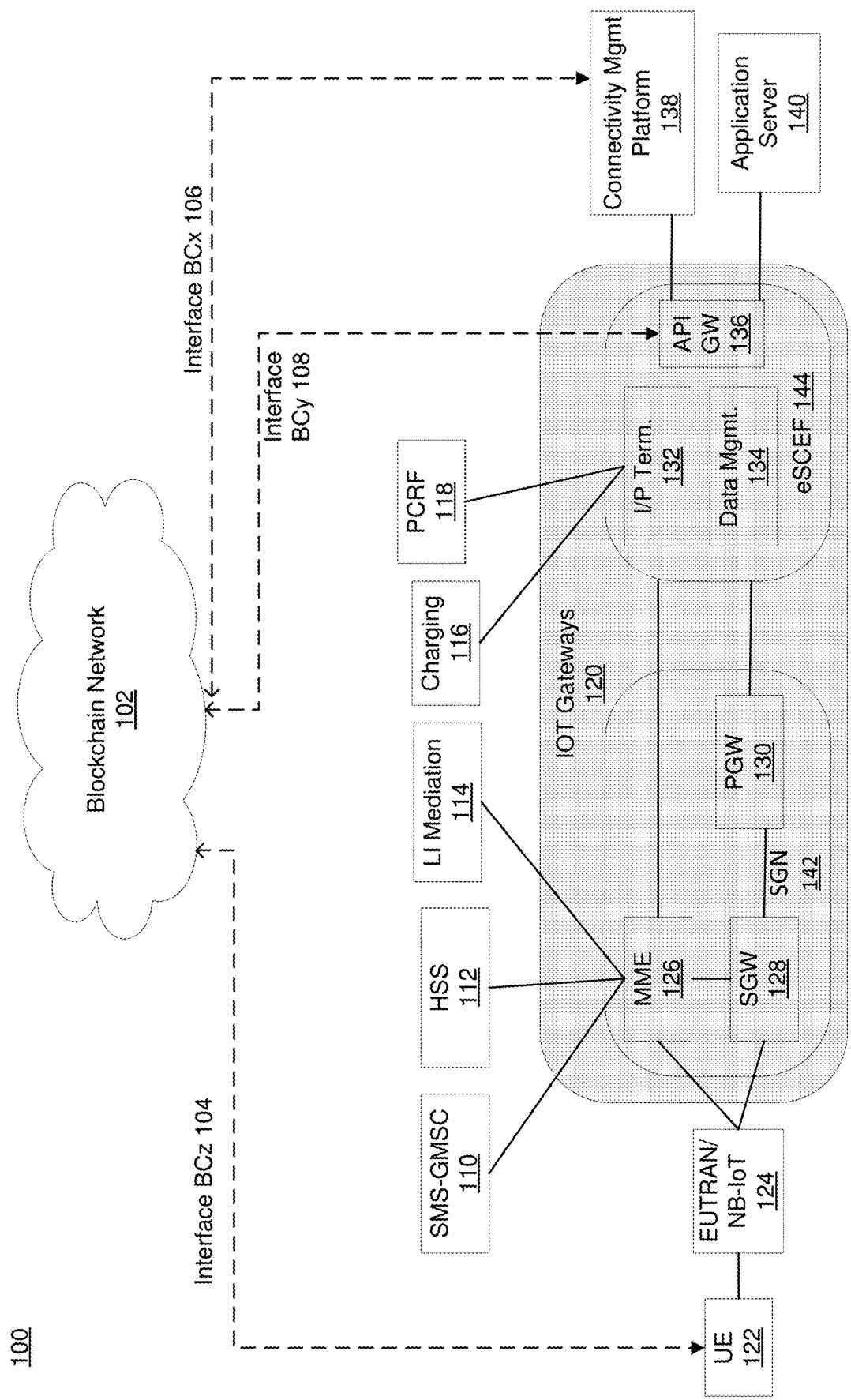
FIG. 1 is a block diagram of a NB-IoT architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable blockchain programming in NB-IoT devices. For example, in various implementations, a method of blockchain authentication is performed by a computing device including one or more processors, and a non-transitory memory. In various implementations, the method includes initializing a blockchain for a machine-to-machine network. In some implementations, the machine-to-machine network is a narrowband internet of things network. In some implementations, the method includes receiving a request for a first set of data from the blockchain by a second device. In some implementations, the method includes determining based on the request, the first set of data from the blockchain by traversing a series of blocks from the blockchain. In some implementations, the method includes packaging the first set of data from the blockchain according to a protocol into a packaged data unit and transmitting the packaged data unit to the second device.

EXAMPLE EMBODIMENTS

Devices in NB-IoT networks may include such things as gas metering, water metering, land/environment monitoring, pollution monitoring, smart buildings, alarm systems, streetlights and waste management. Transactions on all these networks requires a higher level of security to guarantee authentication. The machine-to-machine communication between sensors, various networks and network devices may have several points of potential infiltration or mistrust where malicious entities (e.g., hackers) are able to gain unauthorized access to the system.

Some implementations described herein utilize blockchain (e.g., a distributed ledger) with NB-IoT devices. Some implementations enable cellular and mobile networks in conjunction with NB-IoT devices to participate natively in blockchain networks. Certain implementations may include blockchain-enabled user equipment security, infrastructure security and virtualized workload security within same provider, shared workload across multiple providers, workload mobility security, charging/mediation, and reconciliation and charging records generation mechanisms for NB-IoT roaming.

Mobile operators have begun launching commercial Long-Term Evolution (LTE) IoT networks that support Category M1 and Category NB1 devices. Implementations may use all or part of the various $3^{rd}$ Generation Partnership Project (3GPP) Technical Specifications (TS) 23.501, 23.502, 33.187 and Technical Report (TR) 23.724, incorporated herein by reference. In some implementations, methods from one or more of these standards may use blockchain network and device authentication.

The present disclosure provides a blockchain-enabled system and network where NB-IoT devices can access and utilize various types of blockchain authentication or data verification. Some implementations may deploy blockchain as native protocols inside NB-IoT user equipment firmware. For example, a flag may be set to indicate that the device is blockchain capable. The flag may be transmitted in the registration request on the NB-IoT network. Configuration, verification and comparison of blockchain parameters may be performed within the NB-IoT network. In some examples, an interface may be implemented that uses a Hypertext Transfer Protocol Representational State Transfer Application Program Interface (HTTP REST API) between the user equipment and the blockchain system. In some implementations, this interface may be used to program new blockchain parameters such as an authentication key for the UE, updating of the blockchain, and/or authorization. In some implementations, the interface may enable the user equipment to be accessible regardless of its current attached state.

Some implementations may enable NB-IoT security with blockchain. For example, some implementations may establish blockchain security credentials for network systems such as the SCEF/NEF, NB-IoT Connectivity management and Application Platform. These network devices may register with the blockchain system/network. Once these network devices are registered, they may establish smart contracts through the blockchain and share resources across multiple providers as necessary.

Some implementations may include blockchain-enabled workload management. Some implementations may provide mechanisms to authenticate and assign blockchain security to NB-IoT workload (for example, virtual machines, microservices, and containers) during instantiation when these resources are created and during its life-cycle management. In some implementations, the workloads may be moved and migrated across multi-site distributed network systems such as Network Function Virtualization Infrastructures (NFVI). Some implementations may utilize blockchain security mechanisms to authenticate and authorize workload on any NFVI by establishing a trusted relationship between a workload, such as a Virtual Network Function (VNF) or a VM, and NFVI. Network resources may, therefore, be shared across multiple service providers.

Some implementations may enable network slice allocation, registration and maintenance using blockchain. Limited deployment of blockchains may be used within specific NB-IoT network slices, in some implementations. In other implementations, blockchain capable NB-IoT network slices may be preestablished by using slice selection procedures (such as those described in 3GPP TS 23.501 and 23.502, incorporated herein by reference). In some implementations, when native blockchain NB-IoT user equipment attach to networks, the Access and Mobility Management servers or functions in conjunction with the Network Slice Selection Function (NSSF) may use the slice information, and the blockchain capability indication may redirect to a specific slice.

Some implementations enable NB-IoT providers and networks with blockchain interface and communication. In some implementations, standard communication between an SCEF and NEF with a blockchain system may occur via a protocol. For example, the protocol may interface with SCEF and NEF using a HTTP REST API. In some implementations, one or more of several parameters may be included. For example, parameters such as an authentication vector, user equipment identity (SIM/eSIM or encrypted identity), authorization parameters such as eWallet, resources availability/utilization, and resource sharing parameters may be included.

In some implementations, the blockchain devices and/or network may enable service providers and their customers to develop dynamic contracts and agreements with comprehensive and secure transaction validation based on agreements made. For example, IoT service to end user equipment may require services from multiple service providers which can be provided using blockchain smart contracts. Such contracts may keep an audit trail, and tamper proof transaction records (e.g., for billing and/or accounting purposes).

Attention may be drawn now to the figures for further illustration of the concepts described above. FIG. 1 is a block diagram of a NB-IoT architecture 100 in accordance with some implementations. As illustrated in FIG. 1, in various implementations, the NB-IoT architecture 100 includes a blockchain network 102, a Short Message Service-Gateway Mobile Switching Center (SMS-GMSC) 110, a Home Subscriber Server (HSS) 112, a Lawful Intercept (LI) Mediation entity 114, a Charging entity 116, a Policy and Charging Rules Function (PCRF) 118, a user equipment (UE) 122, an Evolved Universal Terrestrial Radio Access Network (EUTRAN)/NB-IoT 124, IoT Gateways 120, Connectivity Management Platform 138 and Application Server 140. In some implementations, the IoT Gateways 120 include a Serving Gateway Node (SGN) 142 and an Enhanced Service Capability Exposure Function (eSCEF) 144. In some implementations, the SGN 142 includes a Mobility Management Entity (MME) 126, a Serving Gateway (SGW) 128 and/or a Packet Data Network Gateway (PGW) 130. Additionally, in some implementations, the eSCEF 144 includes interface/protocol termination 132, a data management entity 134 and/or an API gateway 136.

In some implementations, the NB-IoT architecture 100 utilizes the 3GPP Technical Specification 23.682, which is incorporated herein by reference. In some implementations, blockchain network 102 communicates with the user equipment 122 over interface BCz 104. In some implementations, the interface BCz 104 executes using HTTP REST API and provides support for configuration, updating, and notification of blockchain credentials between blockchain network 102 and user equipment 122. In some implementations, the communication includes transmission and/or receipt of the authentication public key preset and blockchain queries and settings, for example.

Interface BCy 108 may provide secondary authentication, and authorization. Interface BCy 108 may enable resource sharing, transmission of lawful intercept messages and allocation and maintenance of network slicing. Similarly, interface BCx 106 may communicate between the blockchain network 102 and connectivity management platform 138. Interface BCx 106 may include policy requests and authorizations, network usage information and allocations, lawful intercept messages and accounting, for example.

In some implementations, interface BCz 104 may enable native NB-IoT user equipment with blockchain capabilities. For example, in some implementations, native protocols within the NB-IoT user equipment 122 firmware may be utilized and flags set indicating that the user equipment is blockchain capable during a registration request. Interface BCz 104 may configure, verify and compare blockchain parameters by accessing blockchain network 102. In some implementations, interface BCz 104 may use HTTP REST API between user equipment 122 and a device on blockchain network 102. Interface BCz 104 may be used for programming new blockchain parameters such as authentication keys (e.g., public/private key pairs), updating ledgers, as well as for authorization. In some implementations, interface BCz 104 may be accessible using Bluetooth or Wi-Fi.

In some implementations interface BCx 106 may also use HTTP REST API. In some implementations, interface BCx 106 may communicate and verify the user equipment 122 identification as well as a secondary authentication. In some implementations, interface BCx 106 may facilitate standard communication between eSCEF 144 and the blockchain network 102. In some implementations, interface BCx 106 may carry parameters such as an authentication vector, the user equipment SIM or encrypted identity, authorization parameters, resources availability and utilization and/or resource sharing parameters. In a further example, interface BCx 106 may enable service providers and customers or partners to develop smart contracts and agreements and keep/track an audit trail. The smart contracts may contain transaction records which are not able to be tampered with. In other words, the smart contracts include tamper-proof transaction records.

Figure 2:
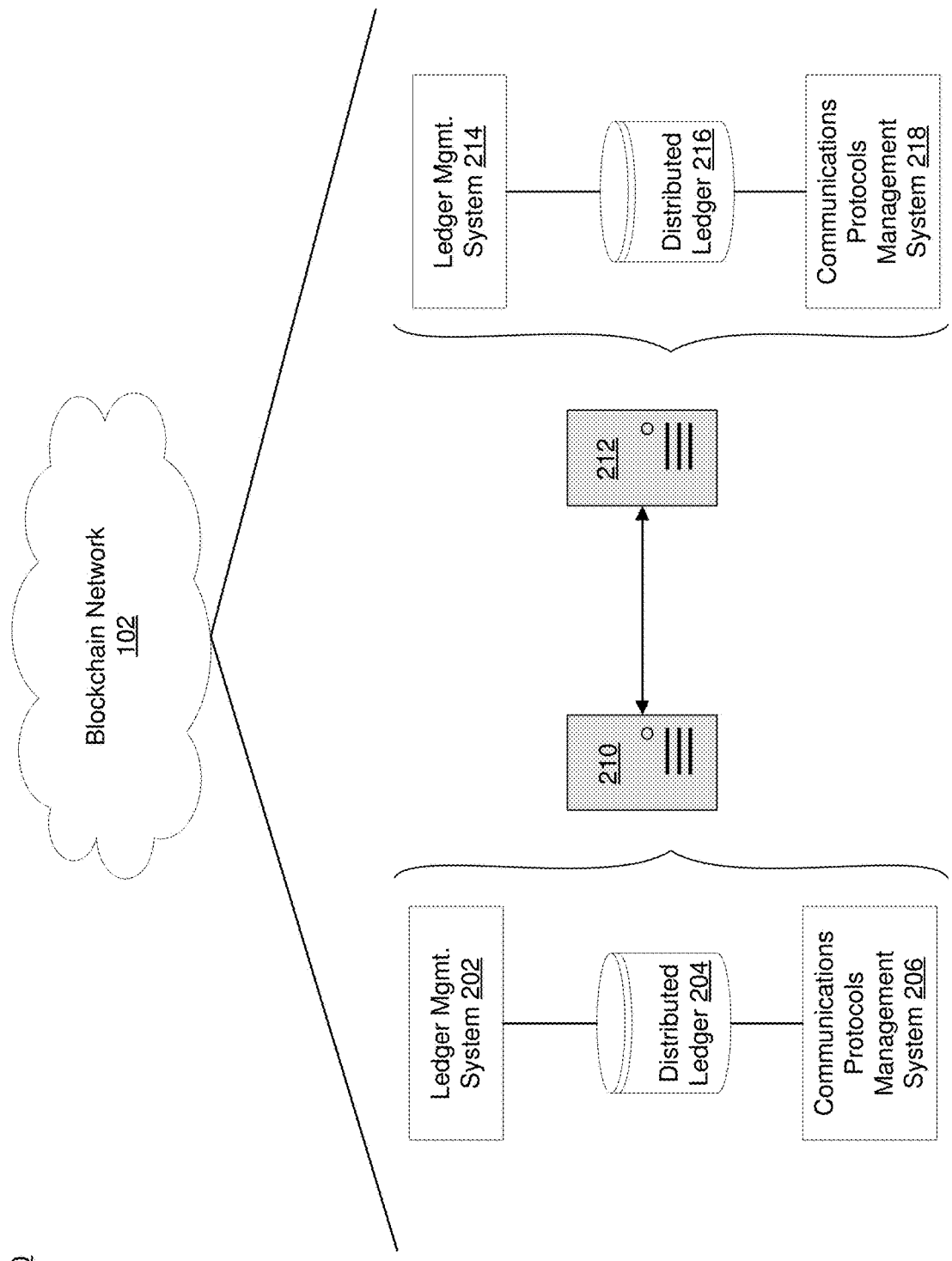
FIG. 2 is a diagram of an example blockchain network in accordance with some implementations.

FIG. 2 illustrates an example blockchain environment 200 in accordance with some implementations. In some implementations, the blockchain environment 200 includes the blockchain network 102. In some implementations, the blockchain network 102 includes a controller 210 and a controller 212. In some implementations, the controllers 210 and 212 communicate over a network such as 5G cellular network, Internet Protocol (IP), NB-IoT, Local Area Network (LAN) or any telecommunications network. In some implementations, the controller 210 and 212 are separate nodes in the blockchain network 102. In some implementations, the controllers 210 and 212 store duplicate instances of a distributed ledger (e.g., the controller 210 stores distributed ledger 204, and the controller 212 stores distributed ledger 216). In the example of FIG. 2, the distributed ledger 204 stored on the controller 210 is a copy (e.g., a duplicate or a replica) of the distributed ledger 216 stored on the controller 212.

In some implementations, the controller 210 includes a ledger management system 202, the distributed ledger 204 and a communication protocols management system 206. Similarly, in some implementations, the controller 212 includes a ledger management system 214, the distributed ledger 216, and a communication protocols management system 218. In some implementations the communication protocols management systems 206 and 218 implement and control interface BCz 104, interface BCx 106 and interface BCy 108.

In some implementations, the ledger management system 202 manages a distributed ledger copied over several nodes on one or more networks. In some implementations, the ledger management systems 202 and 214 prepare and manage the same distributed ledger on one or more nodes in a private system, with local access to the distributed ledger. For example, in some implementations, a network provider maintains a copy of distributed ledgers on several devices such as the PCRF 118, the application servers 140, the MME 126, and the HSS 112 shown in FIG. 1. In some implementations, the blockchain network 102 maintains the distributed ledger(s) over several nodes and across different geographic regions.

In some implementations, the ledger management system 202 performs one or more of the following operations:

1. Adding new/non-removable NB-IoT transactions as well as organizing them into blocks along the distributed ledger 204.
2. Ensuring authenticity for each block using cryptographic hashes and public/private keys.
3. Validating blocks on the blockchain.

In some implementations, the copy of the distributed ledger 204 stored on the controller 210 and the copy of the distributed ledger 216 stored on the controller 212 store information that is utilized by the controllers 210 and 212 to authenticate NB-IoT devices. In some implementations, the copy of the distributed ledger 204 stored on the controller 210 and the copy of the distributed ledger 216 stored on the controller 212 store information that indicates availability/utilization of shared resources. In some implementations, the copy of the distributed ledger 204 stored on the controller 210 and the copy of the distributed ledger 216 stored on the controller 212 store information that is used to enables certain services (e.g., roaming) and/or to compute credits/debits for services used (e.g., to generate bills for services such as roaming).

Figure 3:
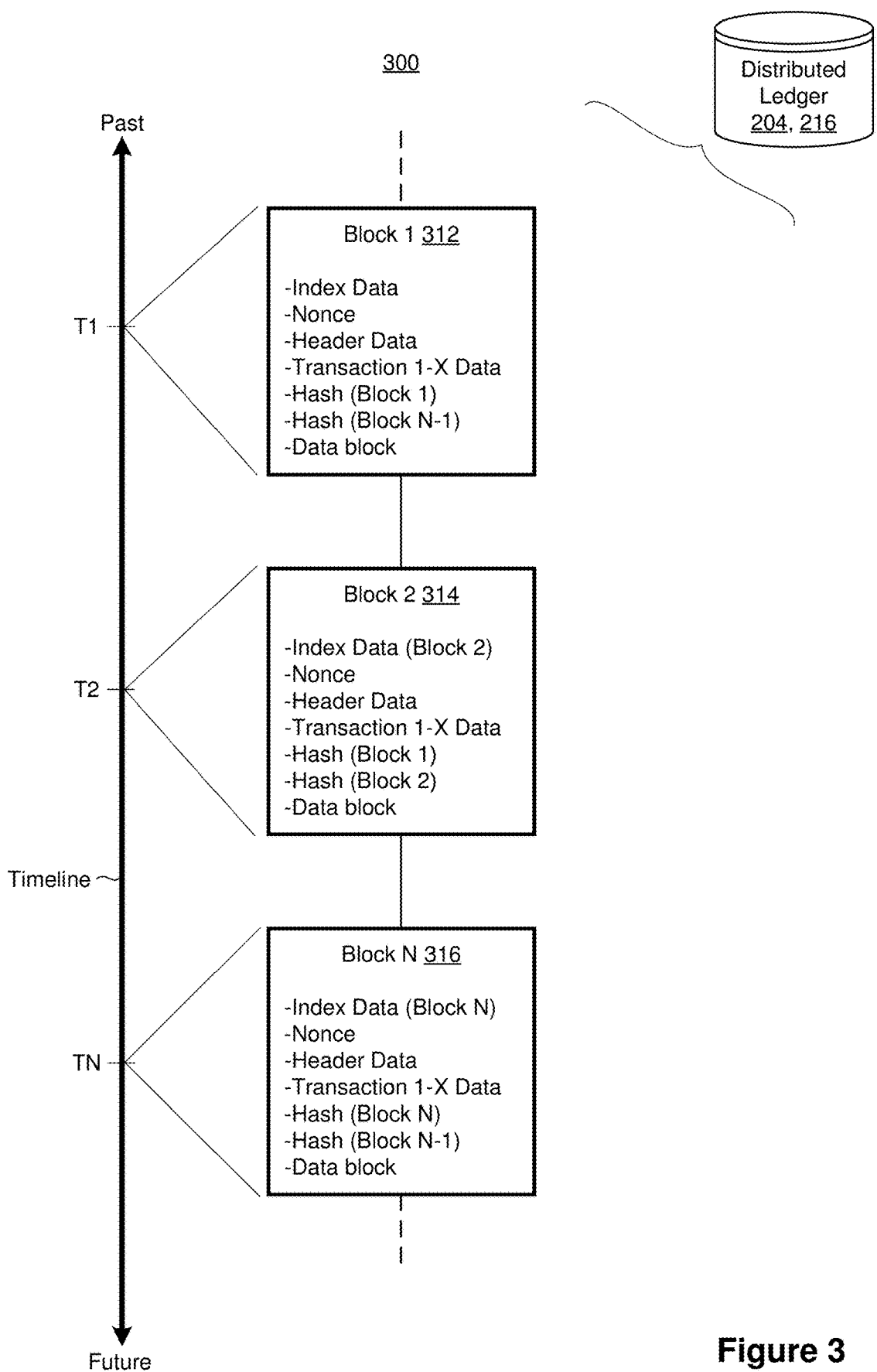
FIG. 3 is a diagram of an example blockchain in accordance with some implementations.

FIG. 3 illustrates an example blockchain 300 in accordance with some implementations. In some implementations, the blockchain 300 implements the distributed ledgers 204 and 216 shown in FIG. 2. In some implementations, the blockchain 300 includes a first block 312, a second block 314 . . . a nth block 316. In some implementations, the blockchain 300 is implemented using a variety of blockchain creation, propagation, authentication and traversal methods. For example, in some implementations, blockchain 300 is a doubly-linked list of ordered blocks. In some implementations, the blockchain 300 is on a distributed timestamping server, using a public or private blockchain database. In some implementations, the blockchain 300 uses or is part of a merkle tree.

In some implementations, the blockchain 300 includes any data blocks that have been validated and added to the blockchain. In some implementations, each node in blockchain network 102 stores a copy of the entire blockchain. In some implementations blockchain 300 is stored among several nodes. In other words, an identical copy of the blockchain is stored on all of the nodes. For example, in some implementations, a copy is stored on multiple networks or providers.

FIG. 3 illustrates example data that is stored on the blockchain 300. For example, in some implementations, the first block 312 includes index data, a nonce, header data, transaction data, a current and previous hash as well as any additional data in the form of a data block. In some implementations, the blockchain 300 includes or formats transaction data for any kind of NB-IoT transaction or procedure. For example, in some implementations, data included in blockchain 300 enables an NB-IoT network to perform authentication and service authorization. In some implementations, data included in blockchain 300 enables an NB-IoT network to perform network slice assignment and allocation. In some implementations, data included in blockchain 300 enables an NB-IoT network to manage and share network resources. In some implementations, data included in blockchain 300 enables an NB-IoT network to perform authentication for workload management. In some implementations, data included in blockchain 300 enables an NB-IoT network to perform roaming authentication. In some implementations, data included in blockchain 300 enables an NB-IoT network to track service usage and perform billing.

In some implementations, when the controller 210 receives an authentication request, the controller 210 traverses the blockchain 300 to verify whether the requesting user equipment has the appropriate permissions as indicated in one or more of the blocks. In some implementations, the controller 212 adds a transaction to the blockchain 300 indicating an assignment of a network slice to a requesting user equipment. In some implementations, a network node in the blockchain network 102 queries the blockchain 300 to authenticate and assign workload resources to a user equipment that can be verified across multi-site distributed network capabilities. In some implementations, a network node in the blockchain network 102 (e.g., the controller 210 and/or the controller 212) queries the blockchain 300 to determine the availability and/or the utilization level of a particular network resource that is designated as a shared network resource. In some implementations, a network node in the blockchain network 102 (e.g., the controller 210 and/or the controller 212) queries the blockchain 300 to determine information regarding usage of a particular service such as roaming. In some implementations, the blockchain network 102 is connected to roaming providers in order to provide the blockchain network 102 with usage data that resides in roaming network(s) controlled by the roaming providers.

Figure 4:
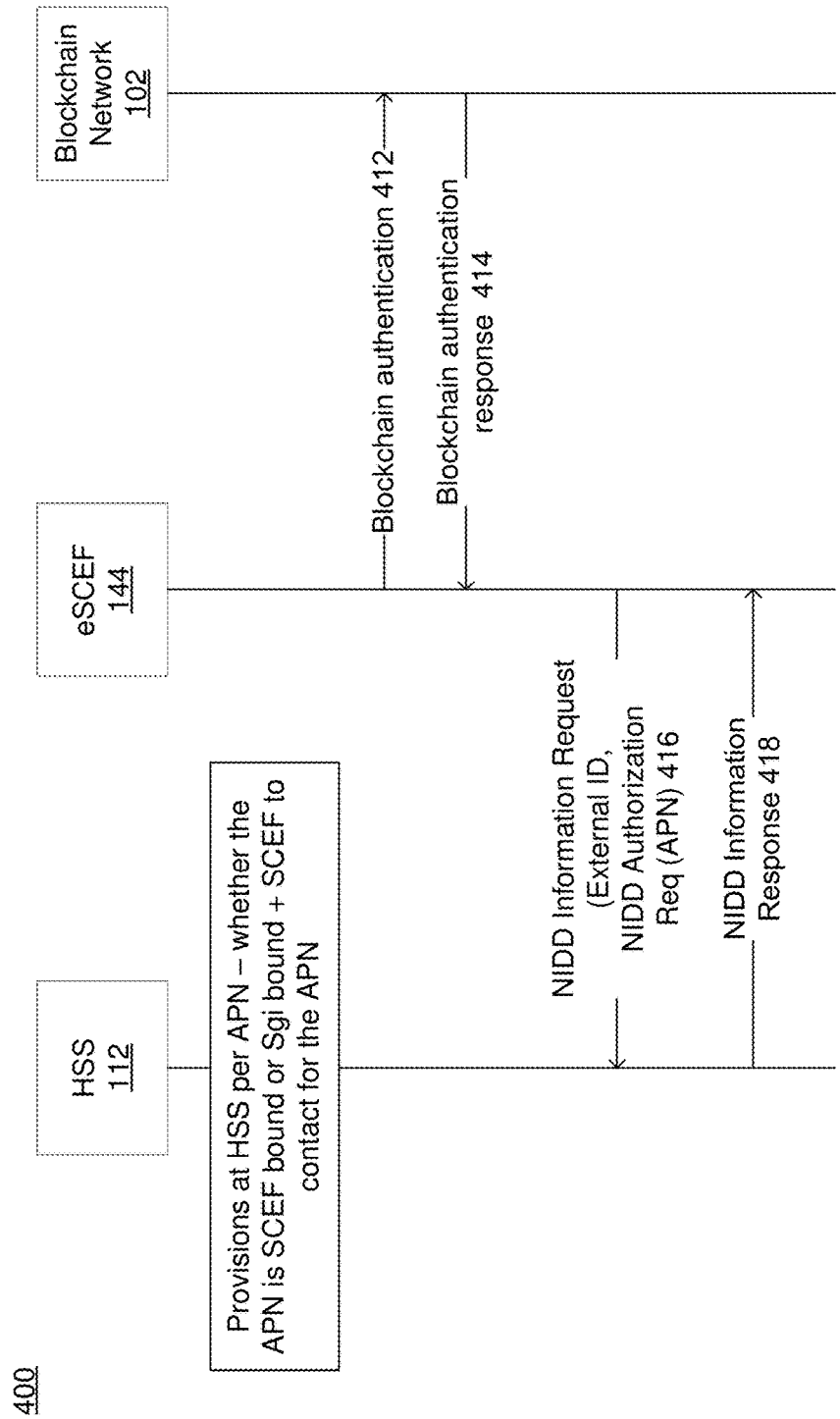
FIG. 4 is a diagram of an example NB-IoT registration procedure in accordance with some implementations.

FIG. 4 illustrates an example NB-IoT registration procedure 400 in accordance with some implementations. In some implementations, there are provisions at the HSS 112 for each APN indicating whether the APN is SCEF-bound or SGI-bound with SCEF to contact for the APN. As represented by operation 412, in some implementations, the NB-IoT registration procedure 400 begins with a blockchain authentication request. For example, in some implementations, the eSCEF 144 transmits a blockchain authentication request to the blockchain network 102.

In some implementations, one or more nodes in the blockchain network 102 verify the request/query upon receiving the request. For example, in some implementations, the controller 210 and/or the controller 212 performs the method according to FIG. 6 to verify the requested information. In some implementations, the blockchain network 102 performs peering or further verifications among other blockchain devices or networks.

As represented by operation 414, in some implementations, the blockchain network 102 (e.g., the controller 210) performs a blockchain authentication and provides an authorization response. For example, in some implementations, the blockchain network 102 accesses the blockchain to determine whether the authentication request is valid. In some implementations, the blockchain network 102 provides a response indicating that the authentication request is valid.

As represented by operation 416, in some implementations, the eSCEF 144 submits a Non-IP Data Delivery (NIDD) request for information to the HSS 112. In some implementations, the eSCEF 144 transmits the NIDD request to the HSS 112 upon receiving the blockchain authentication response from the blockchain network 102. In some implementations, the eSCEF 144 transmits the NIDD request to the HSS 112 in response to the blockchain authentication response indicating that the blockchain authentication was successful. In some implementations, the NIDD request includes an external ID. In some implementations, the NIDD request indicates an APN. As represented by operation 418, in some implementations, the HSS 112 provides a NIDD response to the eSCEF 144.

Figure 5:
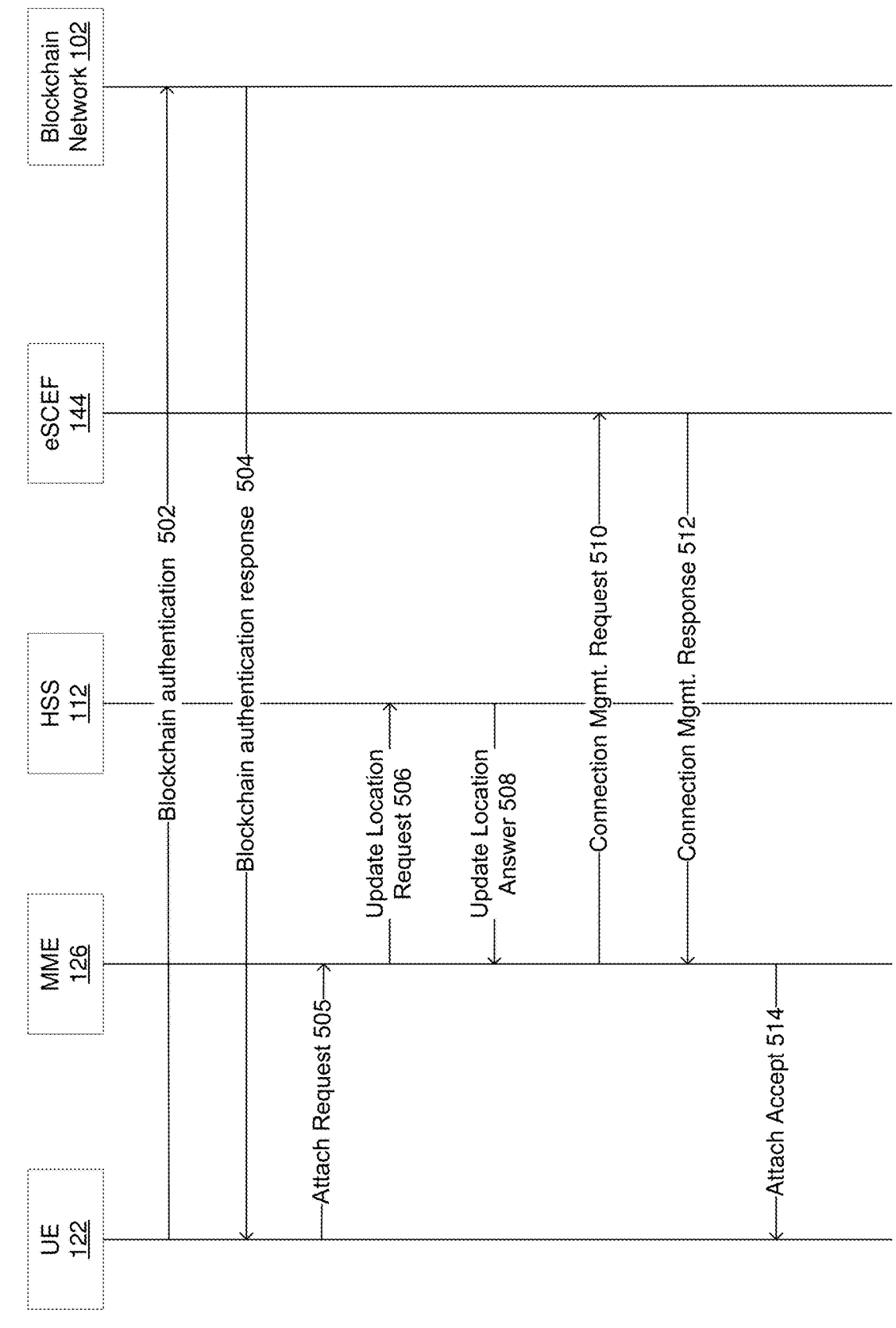
FIG. 5 is a diagram of an example attachment connectivity procedure in accordance with some implementations.

FIG. 5 illustrates an example attachment connectivity procedure 500 in accordance with some implementations. As represented by operation 502, in some implementations, the attachment connectivity procedure 500 beings with a blockchain authentication request or query. As illustrated in FIG. 5, in some implementations, the blockchain authentication request is sent by the user equipment 122 to the blockchain network 102.

As represented by operation 504, in some implementations, the blockchain network 102 (e.g., the controller 210 and/or the controller 212) responds to the query with an authentication response. In some implementations, the blockchain network 102 responds to the query by providing a blockchain authentication response. In some implementations, the blockchain authentication response indicates whether the blockchain authentication was successful or not.

As represented by operation 505, in some implementations, the user equipment 122 transmits an attach request to the MME 126. In some implementations, the user equipment 122 transmits the attach request in response to receiving the blockchain authentication response. In some implementations, the user equipment 122 transmits the attach request in response to the blockchain authentication response indicating that the blockchain authentication was successful.

As represented by operation 506, in some implementations, the MME 126 transmits an update location request to the HSS 112. In some implementations, the MME 126 transmits the update location request to the HSS 112 in response to receiving the attach request from the user equipment 122.

As represented by operation 508, in some implementations, the HSS 112 responds to the MME 126 with an update location response. In some implementations, the HSS 112 provides an update location answer/response to the MME 126 in response to receiving the update location request. In some implementations, the update location answer indicates whether the location has been updated. In some implementations, the update location answer indicates an updated location.

As represented by operation 510, in some implementations, the MME 126 transmits a connection management request to the eSCEF 144. In some implementations, the MME 126 transmits the connection management request to the eSCEF 144 in response to receiving an update location answer from the HSS 112.

As represented by operation 512, in some implementations, the eSCEF 144 provides a connection management response to the MME 126 in response to receiving the connection management request from the MME 126. In some implementations, the connection management response indicates whether the connection management request has been granted or not.

As represented by operation 514, in some implementations, the MME 126 transmits an attach accept message to the user equipment 122. In some implementations, the attach accept message indicates that the attach request that the user equipment 122 sent to the MME 126 has been granted. In some implementations, the MME 126 transmits the attach accept message in response to a successful attachment. In some implementations, the MME 126 transmits an attach reject message in response to an unsuccessful attachment.

Figure 6:
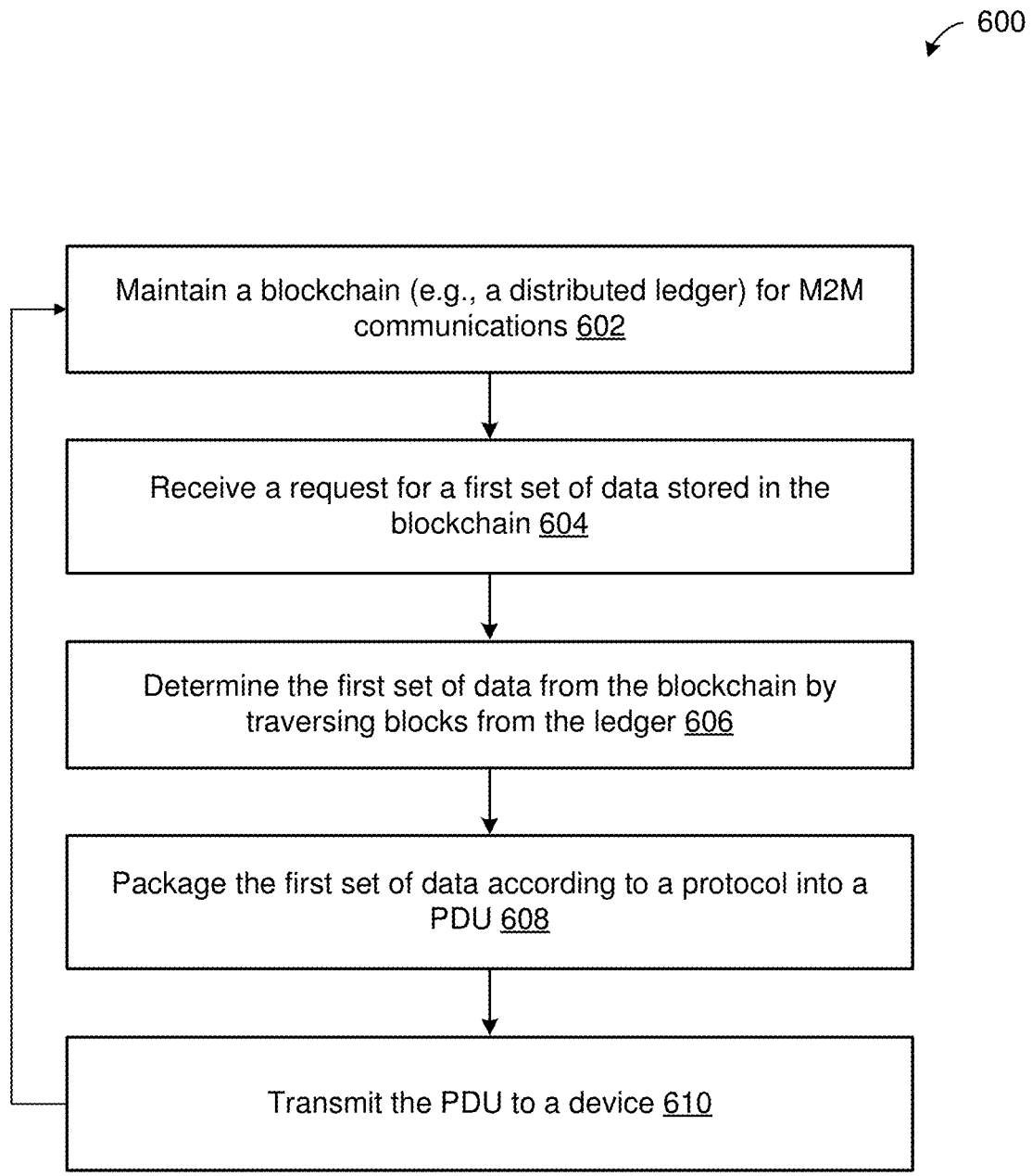
FIG. 6 is an example flowchart of a method for a blockchain-based NB-IoT network in accordance with some implementations.

FIG. 6 illustrates an example flowchart of a method 600 in accordance with some implementations. As represented by block 602, in some implementations, the method 600 includes generating and/or maintaining a blockchain (e.g., a distributed ledger). For example, as illustrated in FIG. 2, in some implementations, the controller 210 maintains the distributed ledger 204.

In some implementations, the method 600 includes performing actions associated with creation, verification and/or management of a blockchain. For example, in some implementations, the controller 210 performs actions associated with creation, verification and management of a blockchain. In some implementations, the method 600 includes utilizing a blockchain interface (e.g., the interface BCz 104, interface BCx 106 and/or interface BCy 108 shown in FIG. 1). For example, the controller 210 may follow interface BCz 104, interface BCx 106 and/or interface BCy 108 for the management of the blockchain. In some implementations, the method 600 includes programming blockchain parameters such as an authentication key, and user equipment device authorization. In some implementations, the controller 210 programs the blockchain parameters (e.g., the authentication key, and user equipment device authorization).

In some implementations, the method 600 includes establishing blockchain security credentials for various network devices or network functions. In some implementations, the controller 210 establishes blockchain security credentials for various network devices or network functions. For example, the data in a block may indicate the blockchain security credentials and/or the related network devices. In some implementations, the method 600 includes registering one or more network devices or functions with the blockchain. For example, in some implementations, one or more network devices or functions registers individually in the blockchain. In some implementations, the method 600 includes managing and maintaining network slice allocation and identification within the blockchain. In some implementations, the controller 210 manages and maintains network slice allocation and identification within the blockchain. For example, upon attachment to a network of a NB-IoT device, the slice assignment for that device may be added to the blockchain.

In various implementations, the method 600 includes managing various resources via the blockchain. In some implementations, the method 600 includes managing resources that are designated as shared resources via the blockchain. In some implementations, the method 600 includes tracking an availability and/or a utilization level of the resources. In various implementations, the method 600 includes managing various services via the blockchain. In some implementations, the method 600 includes managing services such as roaming via the blockchain. In some implementations, the method 600 includes tracking usage of services via the blockchain. In some implementations, the method 600 includes computing credits/debits associated with usage of services based on information stored in the blockchain.

As represented by block 604, in some implementations, the method 600 includes obtaining a request for a first set of data stored in the blockchain. For example, in some implementations, the controller 210 receives a request for one or more sets of data from the blockchain. In some implementations, the method 600 includes receiving, for example, a request for an authentication vector, user equipment identity, authorization parameters, and/or resource availability/utilization. In some implementations, the method 600 includes receiving a request for network slice information. In some implementations, the method 600 includes receiving a request for workload information corresponding to network devices. In some implementations, the method 600 includes receiving a request for security credentials and/or smart contract information. In some implementations, the method 600 includes receiving a request for information corresponding to a service such as roaming. In some implementations, the method 600 includes receiving a request for information corresponding to billing (e.g., billing related to roaming) In some implementations, the method 600 includes receiving a request for charges incurred for certain services (e.g., charges incurred for roaming).

As represented by block 606, in some implementations, the method 600 includes identifying, verifying and determining one or more pieces of data as requested in block 604. In some implementations, the method 600 includes beginning at the genesis block and following along the linked blocks of the blockchain to find the required transaction or set of data. In some implementations, the controller 210 begins at the genesis block and follows along the linked blocks of the blockchain to find the required transaction or set of data. In some implementations, the method 600 includes utilizing a search algorithm or a search API to search the blockchain for the requested information. In some implementations, the method 600 includes identifying a specific network slice that a NB-IoT device is assigned. For example, in some implementations, the controller 210 identifies a specific network slice that a NB-IoT user equipment is assigned. In some implementations, the method 600 includes reading and verifying a smart contract to determine which shared resources are allocated to and/or requested for a NB-IoT device. For example, the controller 210 reads and verifies a smart contract to determine what shared resources are allocated to and/or requested for a NB-IoT user equipment device. In some implementations, the method 600 includes retrieving information corresponding to roaming. In some implementations, the method 600 includes retrieving information corresponding to billing (e.g., billing information related to roaming) In some implementations, the method 600 includes computing, based on information stored in the blockchain, charges incurred for certain services (e.g., charges incurred for roaming).

As represented by block 608, in some implementations, the method 600 includes packaging one or more data sets in accordance with an established or requested protocol. For example, in some implementations, the controller 210 packages one or more sets of data according to an established or requested protocol. In some implementations, the method 600 includes packaging the one or more data sets in accordance with a protocol associated with a blockchain interface over which the request was received. For example, if the request was received over interface BCz 104, then the method 600 includes packaging the data set(s) in accordance with a protocol associated with interface BCz 104. Similarly, if the request was received over interface BCx 106, then the method 600 includes packaging the data set(s) in accordance with a protocol associated with interface BCx 106. In some implementations, the controller 210 packages sets of data according to details of the interface BCz 104, the interface BCx 106 and/or the interface BCy 108. In some implementations, the method 600 includes setting a flag indicating that the NB-IoT device is blockchain capable. For example, in some implementations, the controller 210 sets a flag indicating the NB-IoT user equipment device is blockchain capable. In some implementations, the method 600 includes packaging additional data set(s) into the PDU.

As represented by block 610, in some implementations, the method 600 includes transmitting the PDU or other information to an NB-IoT device (e.g., one of the devices in the NB-IoT architecture 100 shown in FIG. 1). For example, in some implementations, the controller 210 transmit the PDU to one of the NB-IoT devices on NB-IoT architecture 100. In some implementations, the method 600 includes utilizing a particular blockchain interface to transmit the PDU. For example, in some implementations, the method 600 includes using interface BCy 109 to transmit the requested information to the API gateway 136. In some implementations, the method 600 includes transmitting the requested information to the connectivity management platform 138 via interface BCx 106. In some implementations, the method 600 includes communicating directly with user equipment 122 via interface BCz 104. In some implementations, after transmitting the respective PDU or information, control of the method 600 returns to block 602 for a subsequent query.

Figure 7:
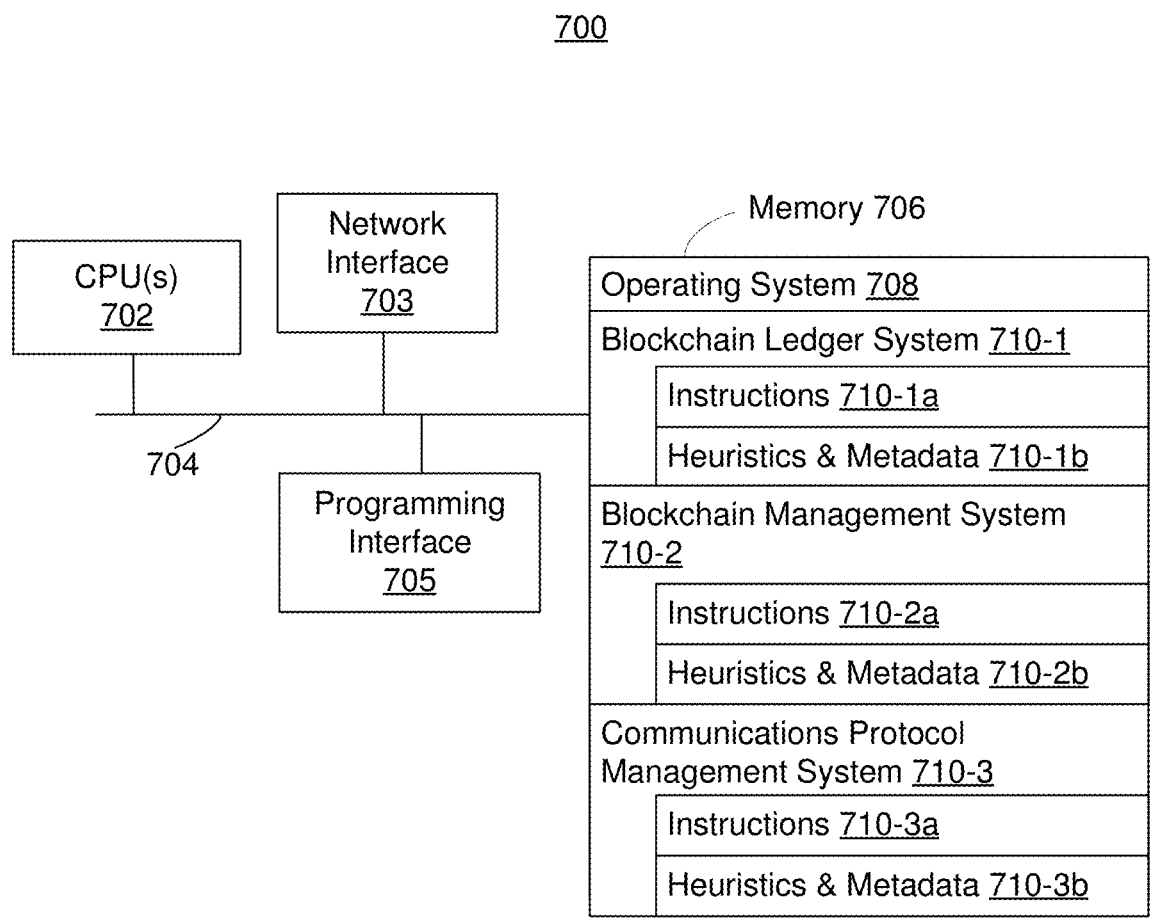
FIG. 7 is a block diagram of a server system enabled with various modules associated with a network node within a cluster of network nodes that are configured to generate and maintain a blockchain in accordance with some implementations.

FIG. 7 is a block diagram of a server system 700 enabled with various systems associated with a network node within a cluster of network nodes that are configured to generate and maintain a distributed ledger in accordance with some implementations. In various implementations, the server system 700 performs one or more of the operations described herein. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 700 includes one or more processing units (CPUs) 702, a network interface 703, a programming interface 705, a memory 706, and one or more communication buses 704 for interconnecting these and various other components.

In some implementations, the network interface 703 is provided to, among other uses, establish and maintain a metadata tunnel between a cloud hosted network management system or blockchain network/device and at least one private network including one or more compliant devices. In some implementations, the communication buses 704 include circuitry that interconnects and controls communications between system components. The memory 706 includes high-speed random-access memory, such as DRAM, SRAM, DDR RAM or other random access solid state memory devices; and may include non-volatile memory, such as one or more magnetic disk storage devices, optical disk storage devices, flash memory devices, or other non-volatile solid-state storage devices. The memory 706 optionally includes one or more storage devices remotely located from the CPU(s) 702. The memory 706 comprises a non-transitory computer readable storage medium.

In some implementations, the memory 706 or the non-transitory computer readable storage medium of the memory 706 stores the following programs, systems and data structures, or a subset thereof including an optional operating system 708, a blockchain ledger system 710-1 ("blockchain system 710-1", hereinafter for the sake of brevity), a blockchain management system 710-2, and a communications protocol management system 710-3. The blockchain system 710-1, the blockchain management system 710-2, and the communications protocol management system 710-3, individually and/or collectively, perform one or more of the operations described herein.

In some implementations, the blockchain system 710-1 stores one or more blockchains (e.g., distributed ledgers) for NB-IoT communications. To that end, in various implementations, the blockchain system 710-1 includes instructions and/or logic 710-1a, and heuristics and metadata 710-1b. In some implementations, blockchain management system 710-2 manages the various protocols and uses of blockchains for NB-IoT devices as discussed herein. To that end, in various implementations, the blockchain management system 710-2 includes instructions and/or logic 710-2a, and heuristics and metadata 710-2b. Similarly, in some implementations, the communications protocol management system 710-3 manages and communicates with interface BCz 104, interface BCx 106 and interface BCy 108. To that end, in various implementations, the communications protocol management system 710-3 includes instructions and/or logic 710-3a, and heuristics and metadata 710-3b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
maintaining, by a controller of a blockchain network, a blockchain in the blockchain network, wherein the blockchain maintains at least one series of blocks and is connected to a machine-to-machine network, wherein the machine-to-machine network is a narrowband internet of things (NB-IoT) network;
receiving, by the controller of the blockchain network, a request over a blockchain interface from a device for a first set of data stored in the blockchain of the blockchain network;
receiving, by the controller of the blockchain network, a registration request to set a flag indicating the device is blockchain capable;

determining, by the controller of the blockchain network, based on the request, the first set of data from the blockchain of the blockchain network by traversing the at least one series of blocks in the blockchain of the blockchain network;

packaging, by the controller of the blockchain network, the first set of data from the blockchain of the blockchain network according to a protocol associated with the blockchain interface into a packaged data unit; and transmitting, by the controller of the blockchain network, the packaged data unit to the device.

2. The method of claim 1,
wherein,
the device is a user equipment device, and
the protocol enables programming blockchain parameters including an authentication key, ledger updating, and user equipment device authorization.

3. The method of claim 1,
wherein,
the device is a user equipment device,
the protocol sets the flag, and
the flag is operable to cause a redirect to a specific slice.

4. The method of claim 1,
wherein,
the device is a narrowband internet of things gateway,
the protocol establishes blockchain security credentials for a set of internet of things network functions, and
the set of internet of things network functions register in the blockchain.

5. The method of claim 4, wherein the set of internet of things network functions share resources across multiple providers using contracts established in the blockchain.

6. The method of claim 1, wherein the protocol is used to establish authentication and authorization in the blockchain between a network function virtualization infrastructure and a virtual network function or virtual machine.

7. The method of claim 1,
wherein,
the device is an application server on the machine-to-machine network using a representational state transfer application programming interface, and
the packaged data unit includes an authentication vector, an identity, an authorization parameter, and a resource sharing parameter defined by the protocol.

8. The method of claim 1, wherein the device is a narrowband internet of things user equipment that is assigned to a specific network slice using the blockchain, when attaching to the machine-to-machine network.

9. The method of claim 1, wherein the packaged data unit includes information that allows the device to use a particular service.

10. The method of claim 9, wherein the packaged data unit includes information regarding usage of the particular service.

11. A computing device comprising:
a processor; and
a non-transitory memory including computer readable instructions that, when executed by the processor, cause the computing device to:
maintain a blockchain of a blockchain network, wherein the blockchain maintains at least one series of blocks and is connected to a machine-to-machine network, wherein the machine-to-machine network is a narrowband internet of things (NB-IoT) network;
receive a request, over a blockchain interface, for a first set of data from the blockchain of the blockchain network by a second device;
receive a registration request to set a flag indicating the second device is blockchain capable;
determine based on the request, the first set of data from the blockchain of the blockchain network by traversing a series of blocks from the blockchain of the blockchain network;
package the first set of data from the blockchain of the blockchain network according to a protocol associated with the blockchain interface into a packaged data unit; and
transmit the packaged data unit to the second device.

12. The computing device of claim 11,
wherein,
the second device is a user equipment device, and
the protocol enables programming blockchain parameters including an authentication key, ledger updating, and user equipment device authorization.

13. The computing device of claim 11,
wherein,
the second device is a user equipment device,
the protocol sets the flag, and
the flag is operable to cause a redirect to a specific slice.

14. The computing device of claim 11,
wherein,
the second device is a narrowband internet of things gateway,
the protocol establishes blockchain security credentials for a set of internet of things network functions, and
the set of internet of things network functions register in the blockchain.

15. The computing device of claim 14, wherein the set of internet of things network functions share resources across multiple providers using contracts established in the blockchain.

16. The computing device of claim 11, wherein the protocol is used to establish authentication and authorization in the blockchain between a network function virtualization infrastructure and a virtual network function or virtual machine.

17. The computing device of claim 11,
wherein,
the second device is an application server on the machine-to-machine network using a representational state transfer application programming interface, and
the packaged data unit includes an authentication vector, an identity, an authorization parameter, and a resource sharing parameter defined by the protocol.

18. The computing device of claim 11, wherein the second device is a narrowband internet of things user equipment that is assigned to a specific network slice using the blockchain, when attaching to the machine-to-machine network.

19. The computing device of claim 11, wherein the packaged data unit includes information that allows the second device to use a particular service.

20. A non-transitory computer readable storage medium storing instructions that, when executed by a processor of a controller causes the controller to perform or cause performance of:
maintaining, by the controller of a blockchain network, a blockchain of the blockchain network, wherein the blockchain maintains at least one series of blocks and is connected to a machine-to-machine network, wherein the machine-to-machine network is a narrowband internet of things (NB-IoT) network;

receiving, by the controller of the blockchain network, a request over a blockchain interface for a first set of data from the blockchain of the blockchain network by a device;

receiving, by the controller of the blockchain network, a registration request to set a flag indicating the device is blockchain capable;

determining, by the controller of the blockchain network, based on the request, the first set of data from the blockchain by traversing a series of blocks from the blockchain of the blockchain network;

packaging, by the controller of the blockchain network, the first set of data from the blockchain of the blockchain network according to a protocol associated with the blockchain interface into a packaged data unit; and transmitting, by the controller of the blockchain network, the packaged data unit to the device.

* * * * *